United States Patent [19]

Weidler

[11] 4,391,313
[45] Jul. 5, 1983

[54] TIRE CHAIN

[75] Inventor: Erhard A. Weidler, Aalen-Unterkochen, Fed. Rep. of Germany

[73] Assignee: RUD-Kettenfabrik Rieger & Dietz GmbH u. Co., Aalen, Fed. Rep. of Germany

[21] Appl. No.: 416,153

[22] Filed: Sep. 9, 1982

[30] Foreign Application Priority Data

Sep. 17, 1981 [DE] Fed. Rep. of Germany ....... 3137310

[51] Int. Cl.³ .............................................. B60C 27/00
[52] U.S. Cl. ............................... 152/171; 24/201 LP; 59/85; 152/185; 152/231; 152/243; 152/245; 403/316
[58] Field of Search ............... 152/167, 171, 172, 185, 152/187, 189, 217, 231, 232, 233, 239, 241, 242-249; 24/116 R, 135 R, 136 R, 201 L, 201 LP, 265 AL; 403/315-319, 378, 379; 59/85, 86, 93

[56] References Cited

U.S. PATENT DOCUMENTS

| 227,292 | 5/1880 | Ownby et al. | 403/319 |
| 1,187,173 | 6/1916 | Putnam | 152/172 |
| 1,527,500 | 2/1925 | Woods | 59/86 |
| 1,806,064 | 5/1931 | Kerkman | 152/239 X |
| 4,147,023 | 4/1979 | Weidler | 59/86 |
| 4,267,871 | 5/1981 | Weidler | 152/189 |
| 4,306,605 | 12/1981 | Weidler et al. | 152/243 X |
| 4,352,382 | 10/1982 | Weidler | 152/189 |

Primary Examiner—Edward C. Kimlin
Assistant Examiner—Thomas Bokan
Attorney, Agent, or Firm—Parmelee, Bollinger & Bramblett

[57] ABSTRACT

At the nodal points of the chain net in a tire chain, components (1) are provided which have at least one T-shaped section, the transverse bar (3,4) of which forms holding arms (5) for chain links (6) to be hung in; in these components, the ends, forming locking pins (9), of a closure element (8) mounted in a bore (7) in the middle of the longitudinal bar of the T-shaped section serve to secure the chain links (6) hung into the hook-shaped holding arms (5) (FIG. 1).

18 Claims, 16 Drawing Figures

TIRE CHAIN

BACKGROUND OF THE INVENTION

The invention relates to a tire chain with a net configuration having nodal points, in which at least three chain links are mutually connected in the region of the nodal points via a component which is arranged horizontally, that is to say parallel to the tire surface, and is provided with hook-shaped holding arms and insertion slots for hanging the chain links in and with at least one closure element for the insertion slots.

In tire chains of the above type, the components arranged in the region of the nodal points are of decisive importance for the strength, mounting, repairs and functional suitability of the chain. Not least for this reason have numerous solutions been developed in endeavours to meet the demands made to the greatest possible extent.

Most widely used are tire chains, in which the components, arranged horizontally at the nodal points, are formed by chain joints having a base body, the shape of which is adapted to the shape of round or oval chain links and which is provided with a closable insertion slot for the chain links to be hung in. In these chain joints, three and more chain links are held in one and the same holder; this is associated with a considerable load on the base body and virtually inevitably requires at least frictional bridging of the ends limiting the insertion slot.

A chain joint of the type indicated is known, for example, from German Auslegeschrift No. 1,283,613. It has a cross-section which entails a comparatively severe restriction of the mobility of the net parts located between the nodal points. To bridge and close the insertion slot, clamping elements which can be screwed together and act frictionally are used in this chain joint; these clamping elements have all the disadvantages caused by unwanted loosening of the screwed connection serving to apply the clamping force.

A chain joint of similar construction, with a clamping connection assisted by positive engagement, is shown by German Utility Model No. 1,971,292. Although the positive engagement here improves the strength of the connection, the risk of unintended loosening remains. A further disadvantage in both the constructions mentioned is that a relatively large number of parts is required for closing the insertion slot, which are moreover located in the wearing zone of the tire chain.

The arrangement of the closure elements of the chain joint according to German Patent Specification No. 2,112,440 is more favourable with regard to wear, since in this joint the screw used for firmly clamping the closure elements has been moved into the plane of the joint. However, the risk of loosening of the screwed connection is still present in this case.

The chain joint according to German Patent Specification No. 1,605,672 manages without a screwed connection supplying the clamping forces; in this case, a closure piece is used which is provided with two bores delimiting the insertion slot and receiving the angled ends of an annular base body. To secure the closure piece, braces are used here, which are subjected to considerable stresses due to an unfavourable arrangement and tend to shear off after the tire chain has been used for a certain period.

A further common disadvantage of all the solutions so far described is that all the chain links to be hung in must be hung at one and the same point into the base body of the chain joints located at the nodal points; this makes it considerably more difficult to join the end links of the chain strands running in different directions from the nodal points, especially in the case of heavy tire protection chains.

A tire chain of the generic type described initally, in which the hanging in of the chain links to be connected to the nodal points is facilitated by the use of components with several insertion slots, is known from U.S. Patent Specification No. 1,806,064. The component arranged in the region of the nodal points is here formed by two parallel plates mounted on a common pivot journal, the edge of the plates being provided with four substantially L-shaped insertion slots. The arrangement of the insertion slots is here such that the chain links can be locked by rotating the superimposed plates, a rivet connecting the plates with one another in the locked state, and locking cams and locking gaps on the mutually facing plate surfaces effecting a retention of the plates in the locked position. The known construction is not really satisfactory, inasmuch as the manufacture of the plates is expensive and their handling and locking on mounting the chains are laborious. Moreover, the strength of the components leaves something to be desired, and the space requirement of the components is large.

SUMMARY OF THE INVENTION

It is the object of the invention further to develop a tire chain of the type under consideration, that is to say a tire chain with components arranged horizontally in the region of the nodal points thereof and having several insertion slots and holding arms associated with the links to be hung individually, in such a way that their components forming the nodal points can, with simple construction and high strength, be readily coupled to chain links and ensure reliable locking of the chain links hung therein. According to the invention, the object is achieved when each component has at least one substantially T-shaped section, of which the transverse bar has curved legs which form holding arms and the longitudinal bar is provided with a bore, the axis of which runs substantially in the centre plane of the holding arms and which serves to receive the centre part of a bolt-shaped closure element, the mutually opposite ends of which form locking pins for the chain links hung into the holding arms of the T-shaped section and into at least one further holding arm.

The tire chain according to the invention has numerous advantages. The components located at the nodal points are simple and stable, and there is no risk of the chain links being inadvertently unhung. The closure element in the form of a bolt is located in a region protected from wear and does not restrict the pivoting movement of the chain links hung into the particular component. The holding arms for the individual chain links can be short and compact and, for this reason, dispense with a frictional or positive bridging of the insertion slots. Due to the fact that several insertion slots located on mutually opposite sides of the longitudinal bar of the T-shaped section are present, the insertion of chain links into the insertion slots does not cause any difficulties, since the insertion paths are short. The distance between the noses of the hung-in chain links can be kept small, and a loss of grip of the running net in the region of the nodal points is prevented. Likewise, a gap in the material subject to wear is avoided, which gap would entail increased wear of adjacent chain links, that is to say those hung into the component. Finally, turning away from the known twin-plate design has the advantage of providing greater freedom with respect to the cross-sectional shape of the component.

BRIEF DESCRIPTION OF THE DRAWINGS

The invention is explained below in more detail by reference to several illustrative embodiments represented in the attached drawing in which.

DESCRIPTION OF PREFERRED EMBODIMENTS

Figure 1:
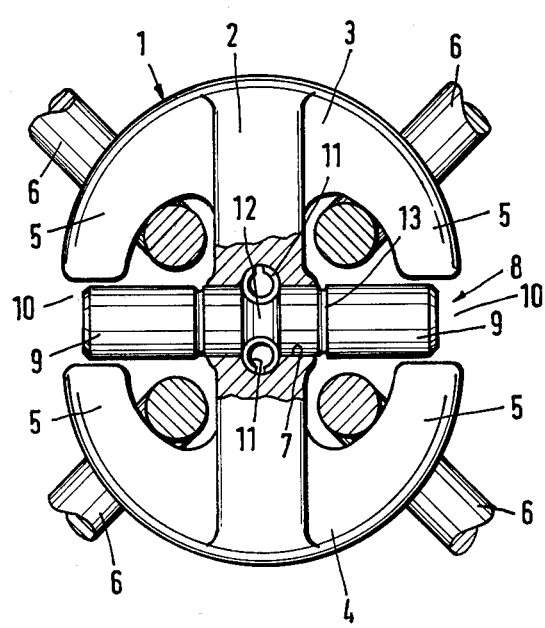
FIG. 1 shows, partially in section, a plan view of a first nodal point of a tire chain.

In FIG. 1, 1 generally denotes a component which consists of two mutually opposite T-shaped sections which have a common longitudinal bar 2 and two mutually opposite transverse bars 3 and 4. The legs of the transverse bars 3 and 4 are curved and form holding arms 5 for the end links 6 of chain strands mutually joined by the component in the region of the nodal point. The longitudinal bar 2 is provided with central bore 7 for a bolt-shaped closure element 8. The ends of the closure element 8 form locking pins 9 for the chain links 6 hung into the holding arms 5. The locking pins 9 have the task of closing the two mutually opposite insertion slots 10.

To secure the closure element in its closed position, securing sleeves 11 are used, which intersect the bore 7 for the closure element 8 and engage in recesses of the closure element 8. The recesses are here formed by parts of a circumferential retaining groove 12. To facilitate the positioning of the retaining groove 12 of the closure element 8, an orienting aid formed by a slit 13 is provided on either side of the middle of the closure element 8 at a distance which is substantially equal to half the width of that part of the longitudinal bar 2 which surrounds the bore 7.

Figure 2:
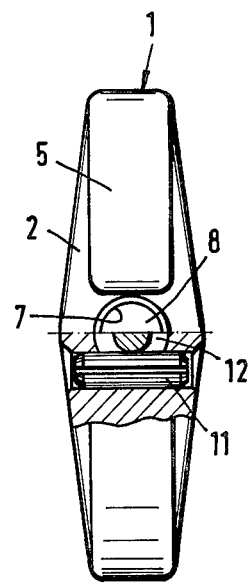
FIG. 2 shows, partially in section, a side view of the component arranged in the nodal point in accordance with FIG. 1.

As can be seen from FIGS. 1 and 2, the longitudinal bar 2 is reinforced in the region of the bore 7 for the closure element 8. The reinforcement makes it possible to use a closure element 8 of comparatively large cross-section and, at the same time, it assists in protecting the closure element from wear attack.

As can be seen, the holding arms are short and compact. Due to the selected curvature, the noses of the chain links 6 come to lie in the immediate vicinity of the longitudinal bar 2. Consequently, the torques exerted on the holding arms 5 are comparatively small, because of the small lever arms present. In plan view, this gives an essentially elliptical component which is distinguished by great robustness and bending strength of the holding arms 5.

Four chain links 6 are simultaneously locked in their position by the closure element 8. The gap between the locking pins 9 and the end faces of the holding arms 5, facing the former, should be as small as possible.

Figure 3:
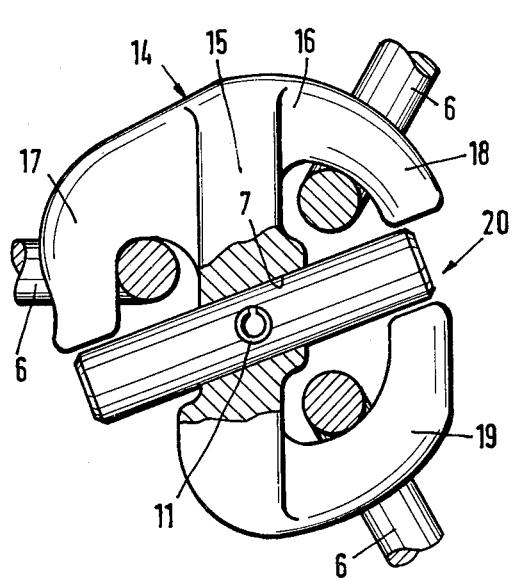
FIG. 3 shows, partially in section, a plan view of a further nodal point of a tire chain.
Figure 4:
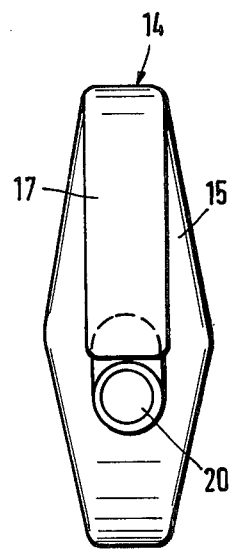
FIG. 4 shows a side view of the component arranged in the nodal point in accordance with FIG. 3.

In FIGS. 3 and 4, a component 14 is shown, the T-shaped section of which consists of a longitudinal bar 15 and a transverse bar 16 which has two holding arms 17 and 18 arranged at a mutual offset in the direction of the longitudinal bar 15. A further holding arm 19 is located at the end of the longitudinal bar 15, facing away from the transverse bar 16. Due to its selected design, this component 14 can be used for providing nodal points with three chain links 6 meeting at the nodal point. The closure element 20, which here is formed by a smooth bolt, runs in this case at an angle to the longitudinal axis of the longitudinal bar 15. A single clamping sleeve 11 serves to secure it.

Figure 5:
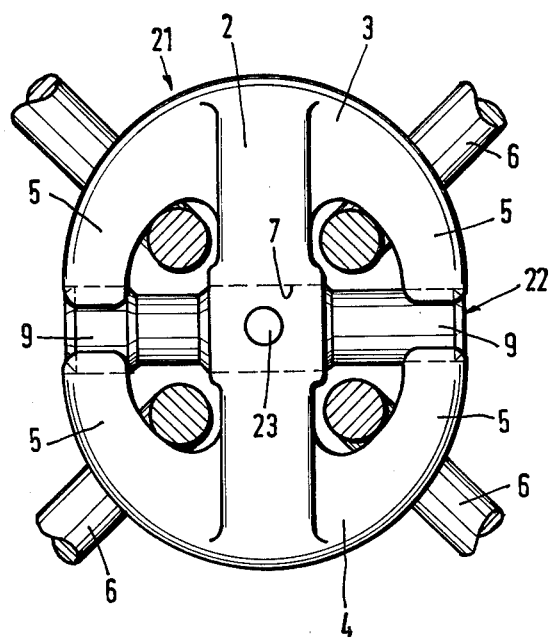
FIG. 5 shows a plan view of a further nodal point.
Figure 6:
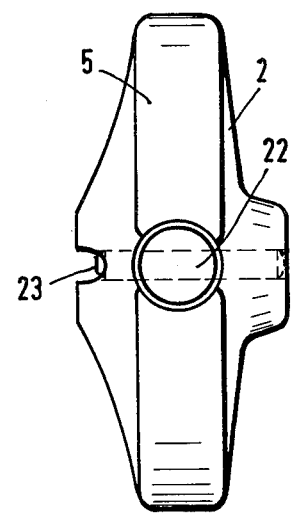
FIG. 6 shows a side view of the component arranged in the nodal point in accordance with FIG. 5.

The component 21 according to FIGS. 5 and 6 corresponds in its construction largely to the component 1 according to FIGS. 1 and 2. The same reference numerals as in FIGS. 1 and 2 are therefore used for characterising its individual parts. Essentially only the closure element 22 and those end faces of the ends of the holding arms 5 which face its locking pins 9 are modified in this construction. The ends of the holding arms 5 have the shape of shells and surround a part of the periphery of the cylindrical outer surfaces of the locking pins 9. In this case, a securing pin 23 is used in place of a securing sleeve. The longitudinal bar 2 is reinforced in such a way that its surface extends into the wearing plane of the tire chain. In this way, the locking pin 9 and the securing pin 23 are protected, and the side of the longitudinal bar facing the roadway can be provided with hard ribs.

Figure 7:
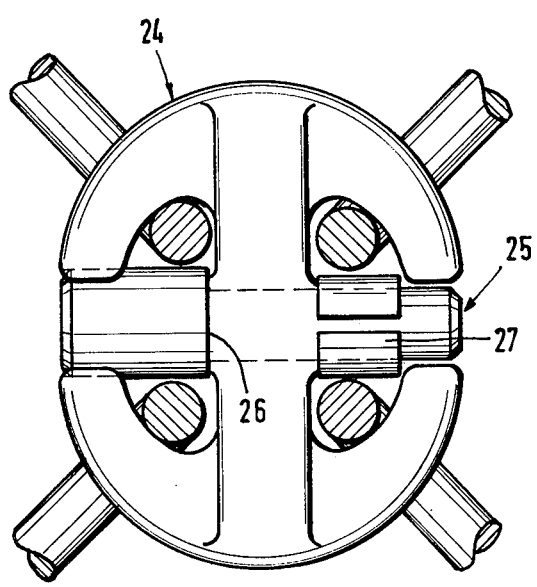
FIG. 7 shows a plan view of a further nodal point of a tire chain.

In the component 24 according to FIG. 7, the closure element 25 is held in its position by a collar 26 formed as an orienting aid and by a clamping sleeve 27.

Figure 8:
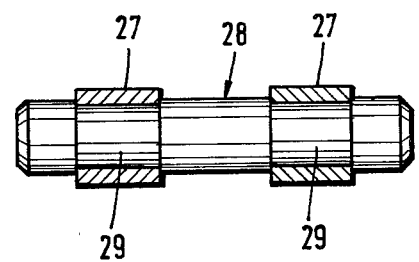
FIG. 8 shows a modified closure element.

FIG. 8 shows a closure element with two clamping sleeves 27 which are mounted in annular grooves 29 of the closure element 28.

Figure 9:
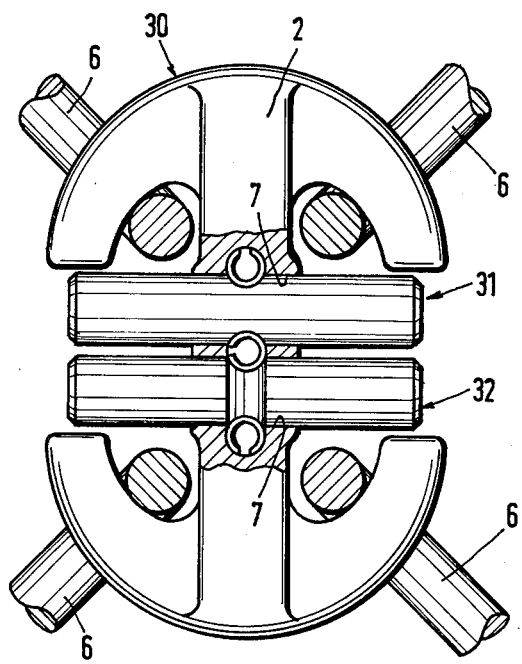
FIG. 9 shows, partially in section, a plan view of a further nodal point of a tire chain.
Figure 10:
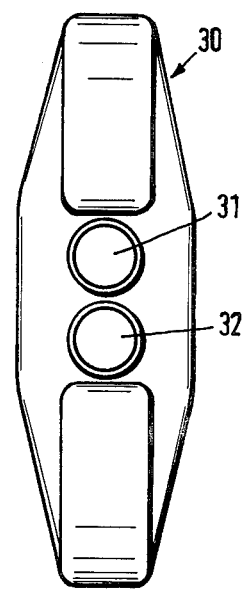
FIG. 10 shows a side view of the component arranged in the nodal point in accordance with FIG. 9.

The component 30 according to FIGS. 9 and 10 is fitted with two closure elements 31 and 32. As a result of using two closure elements of identical or slightly modified design, chain links hung in pairs into the mutually opposite T-shaped sections of the closure element can be locked independently of one another.

Figure 11:
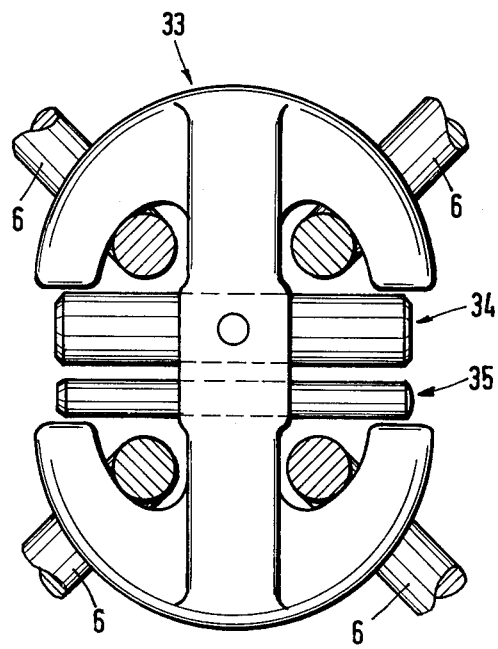
FIG. 11 shows a plan view of a further nodal point.

Independent locking of the chain links 6 associated with mutually opposite T-shaped sections is also possible in the component 33 according to FIG. 11. In this case, a comparatively strong closure element 34 and a weaker closure element 35 are used. In a manner of speaking, the closure element 35 here fulfils only an auxiliary function in locking the lower chain links 6 in their position at intermediate points. Even if the closure element 35 is removed, the closure element 34 still provides security.

Figure 12:
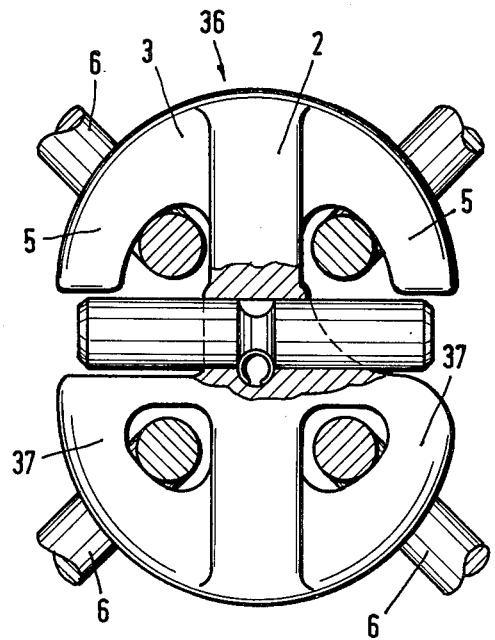
FIG. 12 shows, partially in section, a plan view of a further nodal point of a tire chain.

FIG. 12 shows a component 36 in which the root of the longitudinal bar, here also marked 2, of the T-shaped section is adjoined by two closed eyes 37 for chain links 6.

Figure 13:
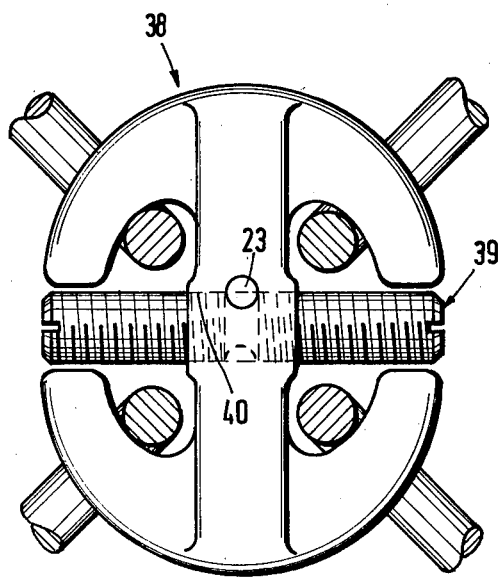
FIG. 13 shows a plan view a further nodal point of a tire chain.

In the component 38 according to FIG. 13, a closure element 39 is used which is formed by a threaded bolt which can be screwed into the bore 40 of the component 38, provided with an internal thread, and which is secured in the securing position by a securing pin 23.

Figure 14:
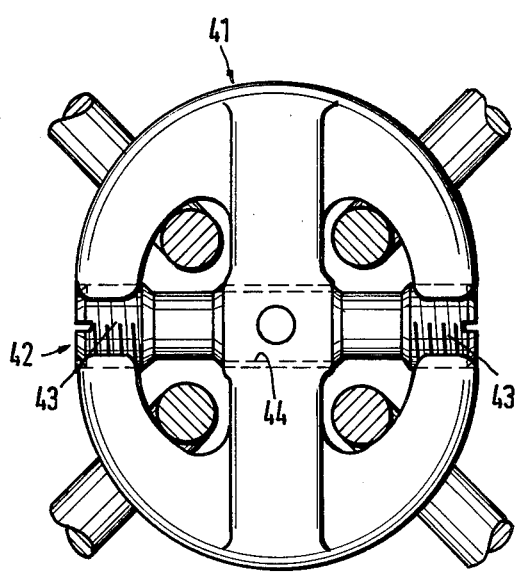
FIG. 14 shows a plan view of a further nodal point of a tire chain.
Figure 15:
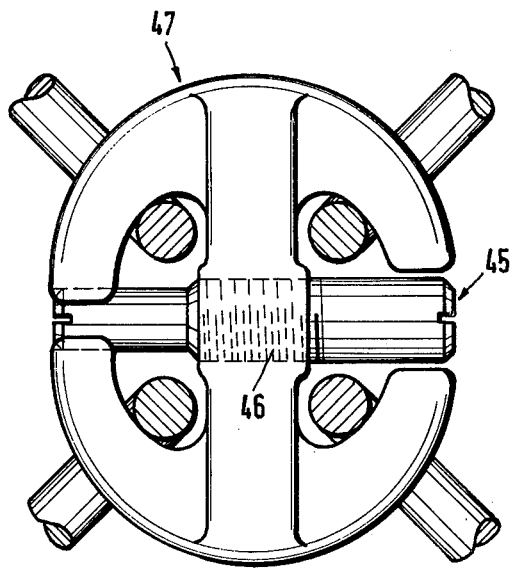
FIG. 15 shows a plan view of a further nodal point of a tire chain.

In the component 41 according to FIG. 14, the place of a closure element 39 formed by a threaded bolt is taken by a closure element 42 which is provided with thread sections 43 and 44. A closure element 45 with a single thread section 46 is used in the component 47 according to FIG. 15.

Figure 16:
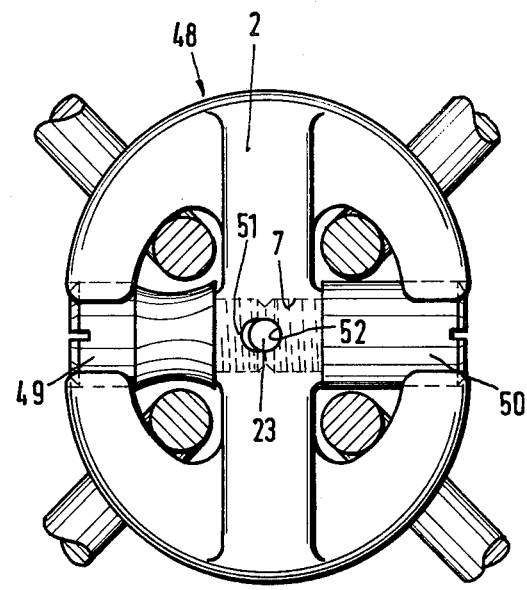
FIG. 16 shows a plan view of a yet again modified nodal point of a tire chain.

Finally, FIG. 16 shows a component 48 with a closure element formed from two parts 49 and 50. The parts 49 and 50 can be introduced from different sides into the bore 7 of the longitudinal bar 2. Their mutually facing ends are provided with thread sections and with mutually opposite grooves 51 and 52 for a securing pin 23.

I claim:

1. Tire chain with a net configuration having nodal points, in which at least three chain links are mutually connected in the region of the nodal points via a component which is arranged horizontally, that is to say parallel to the tire surface, and is provided with hook-shaped holding arms and insertion slots for hanging the chain links in and with at least one closure element for the insertion slots, characterised in that the component (1;14;21;24;30;33;36;38;41;47;48) has at least one substantially T-shaped section, of which the transverse bar (3,4;16) has curved legs which form holding arms (5;17,18) and the longitudinal bar (2;15) is provided with a bore (7), the axis of which runs substantially in the centre plane of the holding arms (5;17,18) and which serves to receive the centre part of a bolt-shaped closure element (8;20;22;25;28;31;32;34;35;39;42;45;49;50), the mutually opposite ends of which form locking pins (9) for the chain links (6) hung into the holding arms (5;17,18) of the T-shaped section and into at least one further holding arm (19).

2. Tire chain according to claim 1, characterised in that the component (1;21;24;30;33;38;41;47;48) has two T-shaped sections with a common longitudinal bar (2) having a transverse bar (3,4) on each of the mutually opposite ends.

3. Tire chain according to claim 2, characterised in that two arcuate holding arms (5) are arranged on each of the ends of the longitudinal bar (2), and the outline of the component—viewed in plan—is substantially elliptical, the longer axis of the ellipse running in the direction of the longitudinal bar (2).

4. Tire chain according to claim 1, characterised in that a further holding arm (19) is arranged on that end of the longitudinal bar (15) which faces away from its end having the two holding arms (17,18), one of the two holding arms (17,18) arranged on one end of the longitudinal bar (15) being offset relative to the other, and a closure element (20) being at an angle to the longitudinal axis of the longitudinal bar (15).

5. Tire chain according to claim 1, characterised in that the root of the longitudinal bar (2) of the T-shaped section of the component (36) is adjoined by two closed eyes (37) for chain links (6).

6. Tire chain according to claim 1 or 2, characterised in that the closure element (8;22) can be retained in the locked position by at least one securing pin or a securing sleeve (11;23), which intersects the bore for the closure element and engages in recesses of the closure element.

7. Tire chain according to claim 6, characterised in that the recesses of the closure element (8) are formed by parts of a circumferential retaining groove (12).

8. Tire chain according to claim 7, characterised in that the retaining groove (12) is located in the middle of the closure element (8), and at least one orienting aid for the orientation of the position of the closure element (8) is disposed at a distance from the retaining groove, which is substantially equal to half the width of that part of the component (1) which surrounds the bore (7).

9. Tire chain according to claim 8, characterised in that the orienting aid is formed by a slit (13).

10. Tire chain according to claim 8, characterised in that the orienting aid is formed by a collr (26).

11. Tire chain according to claim 1 or 2, characterised in that the component (1;14;21) is reinforced in the region of the bore (7) for the closure element.

12. Tire chain according to claim 1 or 2, characterised in that the diameter of the locking pins (9) is approximately equal to the width of the inlet opening of the insertion slots (10) for the chain links (6).

13. Tire chain according to claim 1 or 2, characterised in that the closure element (25) is held in the locking position by at least one resilient clamping sleeve (27).

14. Tire chain according to claim 13, characterised in that the clamping sleeve (27) engages in annular grooves (29) of the closure element (28).

15. Tire chain according to claim 1 or 2, characterised in that the closure element (42) is provided with threaded sections (43,44) associated with threaded sections on the component (41).

16. Tire chain according to claim 1 or 2, characterised in that the closure element consists of two parts (49,50) which can be introduced from different sides into the bore (7) of the longitudinal bar (2).

17. Tire chain according to claim 16, characterised in that the ends of the two parts (49,50) are provided with mutually opposite grooves (51,52) which are to receive a common securing pin (23).

18. Tire chain according to claim 2 or 3, characterised in that the longitudinal bar (2) has two bores (7) which are to receive two closure elements (31,32) associated with the individual T-shaped sections.

* * * * *